(12) United States Patent
Clifton (10) Patent No.: US 11,184,066 B2
(45) Date of Patent: *Nov. 23, 2021

(54) COMMUNICATIONS APPARATUS, METHOD AND MOBILE COMMUNICATIONS SYSTEM

(71) Applicant: Sony Corporation, Tokyo (JP)

(72) Inventor: John Christopher Clifton, Basingstoke (GB)

(73) Assignee: SONY CORPORATION, Tokyo (JP)

( * ) Notice: Subject to any disclaimer, the term of this patent is extended or adjusted under 35 U.S.C. 154(b) by 6 days.

This patent is subject to a terminal disclaimer.

(21) Appl. No.: 16/871,761

(22) Filed: May 11, 2020

(65) Prior Publication Data

US 2020/0274586 A1  Aug. 27, 2020

Related U.S. Application Data

(63) Continuation of application No. 16/346,875, filed as application No. PCT/EP2017/075680 on Oct. 9, 2017, now Pat. No. 10,651,907.

(30) Foreign Application Priority Data

Nov. 18, 2016  (EP) ..................... 16199555

(51) Int. Cl.
*H04B 7/00* (2006.01)
*H04B 7/06* (2006.01)
(Continued)

(52) U.S. Cl.
CPC ............. *H04B 7/0602* (2013.01); *H04B 7/04* (2013.01); *H04B 7/1555* (2013.01); *H04W 16/28* (2013.01); *H04W 74/0833* (2013.01)

(58) Field of Classification Search
CPC ...... H04B 7/0602; H04B 7/04; H04B 7/1555; H04W 16/28; H04W 74/0833
See application file for complete search history.

(56) References Cited

U.S. PATENT DOCUMENTS 6,504,505 B1 * 1/2003 Yung ................. H01Q 3/24
342/374
10,651,907 B2 * 5/2020 Clifton ............... H04B 7/1555
(Continued)

FOREIGN PATENT DOCUMENTS

EP  0777400 A2  6/1997
EP  0777400 A3  5/1999
(Continued)

OTHER PUBLICATIONS

Holma et al., "LTE for UMTS OFDMA and SC-FDMA Based Radio Access", Wiley 2009, System Architecture Based on 3GPP SAE, 11 pages.
(Continued)

*Primary Examiner* — Khai M Nguyen
(74) *Attorney, Agent, or Firm* — Xsensus LLP (57) ABSTRACT

A communications apparatus comprises a power amplifier configured to amplify a signal for transmission, a controllable switch coupled to an output of the power amplifier, an omnidirectional antenna coupled to a first output of the controllable switch, an antenna array coupled to a second output of the controllable switch, the antenna array comprising a plurality of antennas configured to form the signal into a beam of transmitted signals, the beam having a directional bias with respect to a location of the communications apparatus, and a controller. The controller is configured to control the controllable switch to switch a between a first mode of operation of the communications apparatus in which the signal for transmission from the output of the power amplifier is fed to the omnidirectional antenna, and a second mode of operation of the communications apparatus in which the signal from the output of the power amplifier is fed to the antenna array.

15 Claims, 8 Drawing Sheets

(51) Int. Cl.
  *H04W 16/28* (2009.01)
  *H04W 74/08* (2009.01)
  *H04B 7/155* (2006.01)
  *H04B 7/04* (2017.01)

(56) References Cited

U.S. PATENT DOCUMENTS

| | | | | |
|---|---|---|---|---|
| 2003/0214969 | A1* | 11/2003 | Cain | H04L 1/0061 370/443 |
| 2010/0277368 | A1* | 11/2010 | Ponnuswamy | H04W 52/322 342/367 |
| 2011/0188427 | A1* | 8/2011 | Ishii | H04W 52/367 370/311 |
| 2017/0222852 | A1* | 8/2017 | Eitan | H04B 7/0868 |

FOREIGN PATENT DOCUMENTS

| | | | | |
|---|---|---|---|---|
| EP | 1890510 | A2 | 2/2008 | |
| EP | 1890510 | A3 | 3/2013 | |
| EP | 2720378 | A1 * | 4/2014 | H04B 1/005 |
| EP | 2720378 | A1 | 4/2014 | |
| JP | 5-188102 | A | 7/1993 | |
| WO | 2017/132430 | A1 | 8/2017 | |

OTHER PUBLICATIONS

Huawei et al., "Introduction of mobility enhancement UE capabilities", 3GPP TSG-RAN2 Meeting No. 95bis R2-166398, Kaohsiung, Oct. 10-14, 2016, 2 pages.

Chen, "Advanced Architectures for Efficient mm-Wave CMOS Wireless Transmitters", Electrical Engineering and Computer Sciences University of California at Berkeley, May 1, 2014, pp. 1-130.

Samsung, "DL Beam Management in the Multi-Beam based NR system", 3GPP TSG-RAN WG2 Meeting No. 95bis R2-166391, Kaohsiung, Taiwan, Oct. 10-14, 2016, 7 pages.

Ericsson et al., "UEreference architecture for NR", TSG-RAN Working Group 4 (Radio) Meeting No. 81 R4-1609590 Reno, NV, USA, Nov. 14-18, 2015, 5 pages.

Ericsson et al., "TP for 38.803: UE beamforming and number of UE transmitter antennas", TSG-RAN Working Group 4 (Radio) Meeting No. 81 R4-1609592, Reno, NV, USA, Nov. 14-18, 2016, pp. 1-17.

NTT Docomo, "New SID Proposal: Study on New Radio Access Technology", 3GPP TSG RAN Meeting No. 71 RP-160671, Göteborg, Sweden, Mar. 7 -10, 2016, 8 pages.

International Search Report and Written Opinion dated Jan. 22, 2018 far PCT/EP2017/075680 filed on Oct. 9, 2017, 10 pages.

* cited by examiner

COMMUNICATIONS APPARATUS, METHOD AND MOBILE COMMUNICATIONS SYSTEM

CROSS REFERENCE TO RELATED APPLICATIONS

The application is a continuation of U.S. application Ser. No. 16/346,875 filed May 2, 2019, which is based on PCT filing PCT/EP2017/075680 filed Oct. 9, 2017, and claims the benefit of European Patent Application 16199555.0, filed Nov. 18, 2016, the entire contents of each are incorporated herein by reference.

BACKGROUND

Field of Disclosure

The present disclosure relates to a communications apparatus for use in 5G/new radio mobile communications systems, and specifically communications apparatuses which are able to address the requirements of initial access.

The present application claims the Paris Convention priority of European patent application EP16199555.0, the contents of which are hereby incorporated by reference.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present disclosure.

Third and fourth generation wireless communications systems, such as those based on the third generation partnership project (3GPP) defined UMTS and Long Term Evolution (LTE) architecture are able to support sophisticated services such as instant messaging, video calls as well as high speed internet access. For example, with the improved radio interface and enhanced data rates provided by LTE systems, a user is able to enjoy high data rate applications such as mobile video streaming and mobile video conferencing that would previously only have been available via a fixed line data connection. The demand to deploy third and fourth generation networks is therefore strong and the coverage area of these networks, i.e. geographic locations where access to the networks is possible, is expected to increase rapidly.

However, whilst fourth generation networks can support communications at high data rate and low latencies from devices such as smart phones and tablet computers, it is expected that future wireless communications networks will need to support communications to and from a much wider range of devices, including reduced complexity devices, machine type communication (MTC) devices, wearable devices, devices which require little or no mobility, high resolution video displays and virtual reality headsets. As such, the supporting of such a wide range of communications devices, and the device-to-device (D2D) communications between them, can represent a technical challenge for a wireless communications network.

A current technical area of interest to those working in the field of wireless and mobile communications is known as "The Internet of Things" or IoT for short. The 3GPP has proposed to develop technologies for supporting narrow band (NB)-IoT using an LTE or 4G wireless access interface and wireless infrastructure. Such IoT devices are expected to be low complexity and inexpensive devices requiring infrequent communication of relatively low bandwidth data. It is also expected that there will be an extremely large number of IoT devices which would need to be supported in a cell of the wireless communications network. Furthermore such NB-IoT devices are likely to be deployed indoors and/or in remote locations making radio communications challenging.

There is therefore expected to be a desire for future wireless communications networks, which may be referred to as 5G or new radio (NR) system/new radio access technology (RAT), networks, to efficiently support connectivity for a wide range of devices associated with different applications with different characteristic data traffic profiles, resulting in different devices have different operating characteristics/requirements, such as:
  Low latency
  High data rates
  Millimetre wave spectrum use
  High density of network nodes (e.g. small cell and relay nodes)
  Large system capacity
  Large numbers of devices (e.g. MTC devices/Internet of Things devices)
  High reliability (e.g. for vehicle safety applications, such as self-driving cars).
  Low device cost and energy consumption
  Flexible spectrum usage
  Flexible mobility The new RAT is expected to operate in a large range of frequencies, from hundreds of MHz to 100 GHz and it is expected to cover a broad range of use cases. The use cases that are considered can include:
  Enhanced Mobile Broadband (eMBB)
  Massive Machine Type Communications (mMTC)
  Ultra Reliable & Low Latency Communications (URLLC)

The introduction of new radio access technology (RAT) systems/networks therefore gives rise to new challenges for providing efficient operation for devices operating in new RAT networks, including devices able to operate in both new RAT networks (e.g. a 3GPP 5G network) and currently deployed RAT networks (e.g. a 3GPP 4G or LTE network). There is a desire to optimise architectures for mobile communications systems such that improved efficiency and performance can be achieved, as well as allowing for functionality such as initial access. Apparatuses and methods of doing so are addressed by embodiments of the present technique.

SUMMARY OF THE DISCLOSURE

According to embodiments of the present technique, there is provided a communications apparatus comprising a power amplifier configured to amplified a signal received transmission, a controllable switch coupled to an output of the power amplifier, an omnidirectional antenna coupled to a first output of the controllable switch, an antenna array coupled to a second output of the controllable switch, the antenna array comprising a plurality of antennas configured to form the signal into a beam of transmitted signals, the beam having a directional bias with respect to a location of the communications apparatus, and a controller. The controller is configured to control the controllable switch to switch between a first mode of operation of the communications apparatus in which the signal for transmission from the output of the power amplifier is fed to the omnidirectional antenna, and a second mode of operation of the communications apparatus in which the signal from the output of the power amplifier is fed to the antenna array.

Embodiments of the present technique can provide an arrangement in which a power amplifier amplifies a signal for transmission from a communications apparatus and a controllable switched is configured to switch the amplified signal for transmission from either a first output which is fed to an omnidirectional antenna or a second output which feeds the amplified signal to an antenna array, which forms the amplified signal into a beam having a directional bias. The communications apparatus can therefore act in an initial access mode in which the communications apparatus does not know a location of its nearest base station and therefore transmit an initial access signal in all directions using the omnidirectional antenna. In a second mode of operation after the communications device has determined a location of the base station to which it should transmit and receive signals, the controller configures the controllable switch to feed the amplified signal to the antenna array as a beam of signals providing an improvement in transmitted data represented by the transmitted signals. Such an improvement may comprise a higher antenna Effective Isotropic Radiated Power (EIRP). This may then allow for an improved Signal to Noise Ratio (SNR) from the output of the power amplifier.

Embodiments of the present technique can also utilise an arrangement in which a power amplifier is used to amplify the signal for transmission before being phase shifted by each phase shifter associated with an antenna array. As such the amplified signal can be switched to the omnidirectional antenna by the controllable switch for transmission in a first initial access mode or other mode, providing a simplified architecture for switching between omnidirectional transmission to a beam formed transmission.

Embodiments of the present technique can apply equally to the uplink and the downlink, so that a communications device may form a set of beams for transmitting data to the wireless communications network or for receiving data from the wireless communications network.

The foregoing paragraphs have been provided by way of general introduction, and are not intended to limit the scope of the following claims. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings wherein like reference numerals designate identical or corresponding parts throughout the several views, and wherein.

DETAILED DESCRIPTION OF THE EMBODIMENTS

Conventional Communications System and Relay Nodes

Figure 1:
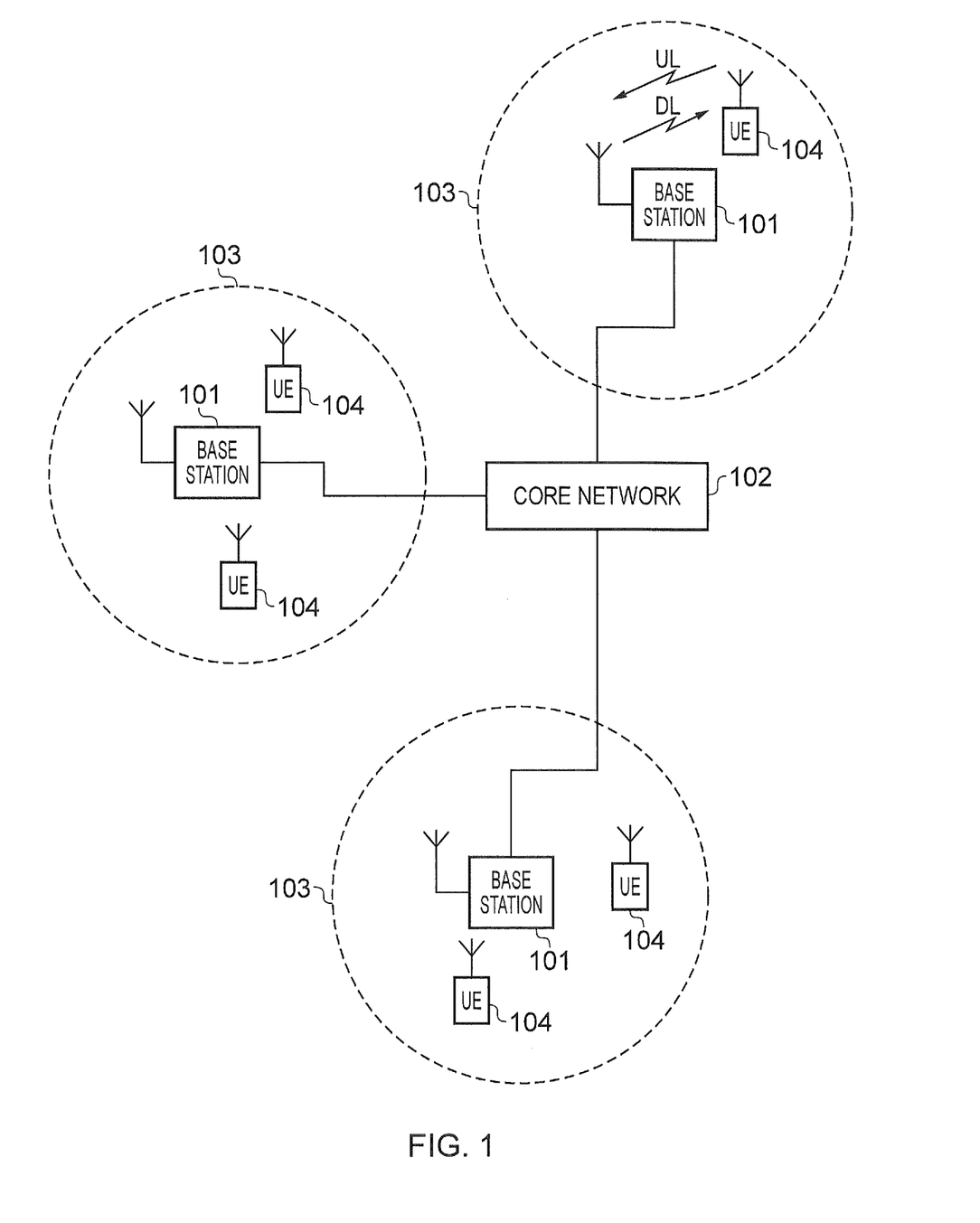
FIG. 1 is a schematic block diagram illustrating an example of a conventional LTE-based mobile telecommunication system.

FIG. 1 provides a schematic diagram illustrating some basic functionality of a mobile telecommunications network/system operating in accordance with LTE principles and which may be adapted to implement embodiments of the disclosure as described further below. Various elements of FIG. 1 and their respective modes of operation are well-known and defined in the relevant standards administered by the 3GPP® body, and also described in many books on the subject, for example, Holma H. and Toskala A [1]. It will be appreciated that operational aspects of the telecommunications network which are not specifically described below may be implemented in accordance with any known techniques, for example according to the relevant standards.

The network 100 includes a plurality of base stations 101 connected to a core network 102. Each base station provides a coverage area 103 (i.e. a cell) within which data can be communicated to and from communications devices 104. Data is transmitted from base stations 101 to communications devices 104 within their respective coverage areas 103 via a radio downlink. Data is transmitted from communications devices 104 to the base stations 101 via a radio uplink. The uplink and downlink communications are made using radio resources that are licenced for exclusive use by the operator of the network 100. The core network 102 routes data to and from the communications devices 104 via the respective base stations 101 and provides functions such as authentication, mobility management, charging and so on. Communications devices may also be referred to as mobile stations, user equipment (UE), user device, mobile radio, and so forth. Base stations may also be referred to as transceiver stations/infrastructure equipment/NodeBs/eNodeBs (eNB for short), and so forth.

Wireless communications systems such as those arranged in accordance with the 3GPP defined Long Term Evolution (LTE) architecture use an orthogonal frequency division modulation (OFDM) based interface for the radio downlink (so-called OFDMA) and a single carrier frequency division multiple access scheme (SC-FDMA) on the radio uplink.

New Radio Communications System

Figure 2A:
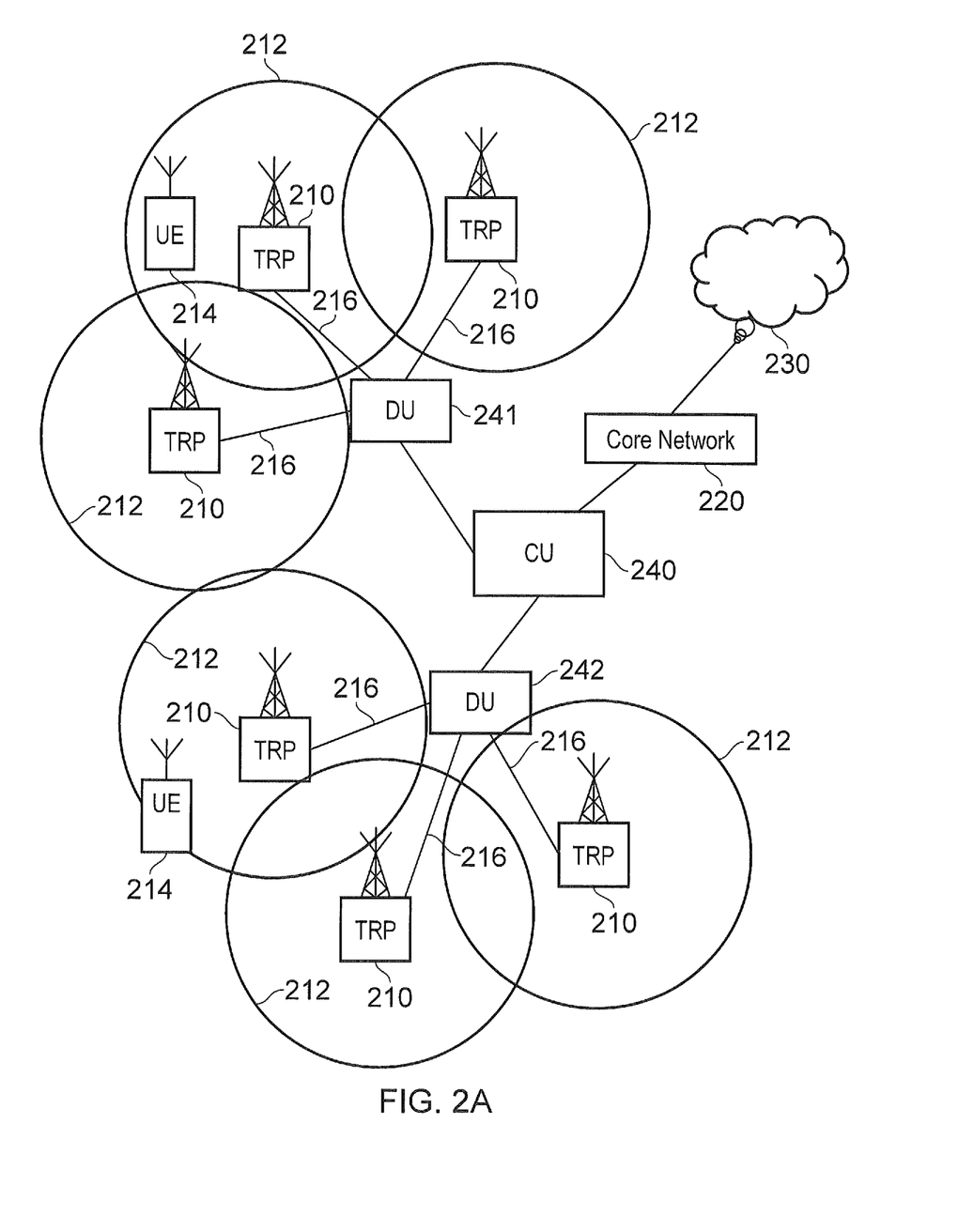
FIG. 2A is a schematic block diagram illustrating an example of a mobile telecommunication system with architectural components corresponding to that of an enhanced New Radio (NR) or 5G network.

An example configuration of a wireless communications network which uses some of the terminology proposed for NR and 5G is shown in FIG. 2A. In FIG. 2A a plurality of transmission and reception points (TRPs) 210 are connected to distributed control units (DUs) 241, 242 by a connection interface represented as a line 216. Each of the TRPs 210 is arranged to transmit and receive signals via a wireless access interface within a radio frequency bandwidth available to the wireless communications network. Thus within a range for performing radio communications via the wireless access interface, each of the TRPs 210, forms a cell of the wireless communications network as represented by a dashed line 212. As such wireless communications devices 214 which are within a radio communications range provided by the cells 210 can transmit and receive signals to and from the TRPs 210 via the wireless access interface. Each of the distributed control units 241, 242 are connected to a central unit (CU) 240 via an interface. The central unit 240 is then connected to the a core network 220 which may contain all other functions required to transmit data for communicating to and from the wireless communications devices and the core network 220 may be connected to other networks 230.

The elements of the wireless access network shown in FIG. 2A may operate in a similar way to corresponding elements of an LTE network as described with regard to the example of FIG. 1. It will be appreciated that operational aspects of the telecommunications network represented in FIG. 2A, and of other networks discussed herein in accordance with embodiments of the disclosure, which are not specifically described (for example in relation to specific communication protocols and physical channels for communicating between different elements) may be implemented in accordance with any known techniques, for example according to currently used approaches for implementing such operational aspects of wireless telecommunications systems, e.g. in accordance with the relevant standards.

The TRPs 210 of FIG. 2A may in part have a corresponding functionality to a base station or eNodeB of an LTE network. Similarly the communications devices 214 may have a functionality corresponding to UE devices known for operation with an LTE network. It will be appreciated therefore that operational aspects of a new RAT network (for example in relation to specific communication protocols and physical channels for communicating between different elements) may be different to those known from LTE or other known mobile telecommunications standards. However, it will also be appreciated that each of the core network component, base stations and terminal devices of a new RAT network will be functionally similar to, respectively, the core network component, base stations and terminal devices of an LTE wireless communications network.

Figure 2B:
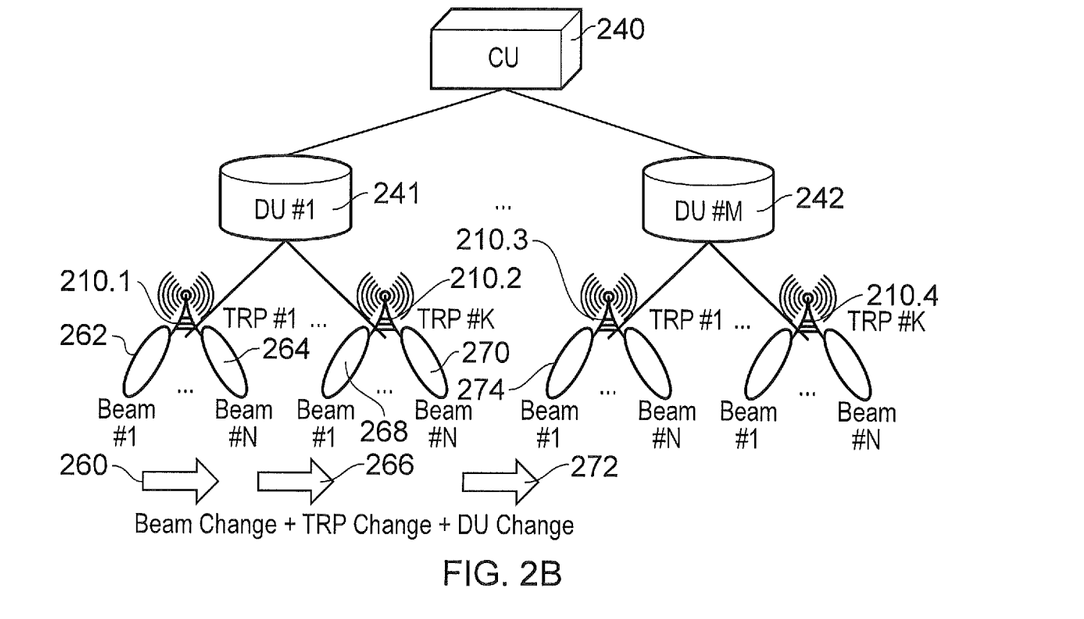
FIG. 2B is a simplified representation of the communications network shown in FIG. 2A, illustrating a process of handover of a communications device as it travels through the mobile communications network.

FIG. 2B provides a schematic representation of the wireless communications network shown in FIG. 2A arranged to illustrate a scenario of communication with a UE 214 which is mobile. As will be appreciated if a UE 214 is transmitting from left to right and detecting the beams formed by the TRPs 210.1, 210.2 the UE 214 may be able to detect each of the beams in turn but not contemporaneously. Accordingly, the UE 214 should be arranged to hand over between different TRPs to transmit and/or receive signals represented as different beams as it travels from a left hand side of FIG. 2B to the right hand side. Thus as shown by a first arrow 260 as a UE 214 travels from an area where it can receive a first of the beams 262 to an area where it can receive a second of the beams 264, the UE 214 should hand over transmission and reception from the first beam 262 to the second beam 264. However as represented by a second arrow 266, as the UE 214 travels further to detect a first beam 268 of a second TRP 210.2, then the UE 214 should hand over from the first TRP 201.1 to the second TRP 210.2. Furthermore as the UE 214 travels further 272 to detect a further beam 274 transmitted by a third TRP 210.3, then the UE 214 should hand over from a first of the distributed units 241 to a second the distributed units 242. More details of the handover arrangement are disclosed in [2].

It has been proposed that a wireless communications interface provided to a future wireless communications network may be operating with high frequency carriers such as those within a millimetre waveband, for example with a large frequency range between 20 GHz and 100 GHz to enable a large frequency bandwidth, for example with a few hundred MHz to 1 GHz, to be used offering very high throughput for eMBB services and support large capacity. However, operation in such high frequency bands leads to very high propagation loss leading to small coverage areas of a cell radius within a few tens of meters. One way of overcoming a poor coverage area within a millimetre waveband is to beam form the signal. That is to concentrate the energy of the signal to within a narrow beam, which allows the eNB to reach larger distances.

Figure 3:
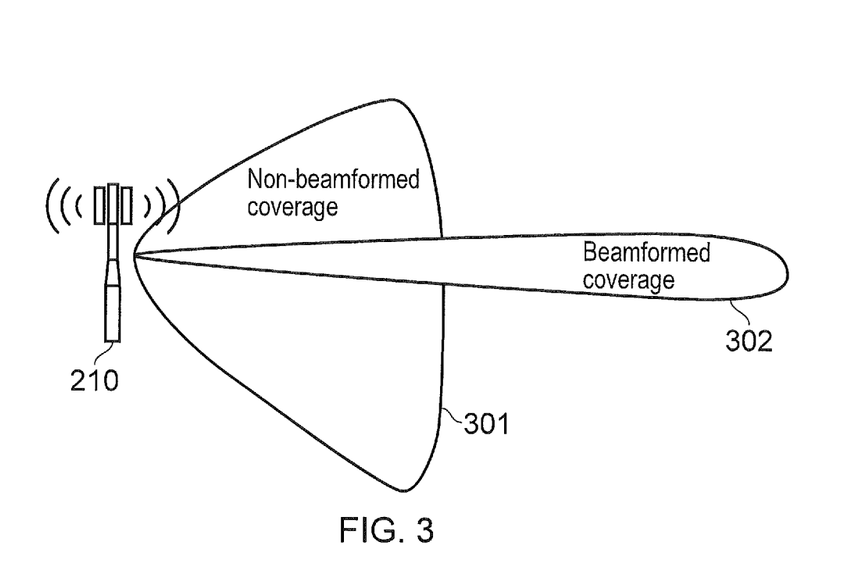
FIG. 3 is a schematic representation illustrating a difference between transmitting signals from a sectorised antenna and signals transmitted as a beam.

FIG. 3 shows coverage achieved with and without beamforming. A conventional sectorised antenna without beamforming would cover a broad area 301 but with shorter reach whereas using beamforming, the eNB covers a narrow area 302 but reaches larger distances. Since the wavelength of radio waves in the millimetre waveband is small, a large number of antenna elements e.g. 10s to 100s, can be packed into a transmission and reception points (TRP) 210 thereby giving higher flexibility in forming beams (i.e., beams can be very narrow). Accordingly, it is proposed to use beam forming in which radio signals are transmitted from a plurality of antennas which combine coherently in a certain direction and so a signal power within this direction is significantly higher than a signal strength in other directions. Such an arrangement is disclosed by a more detailed representation of components shown in FIG. 2A in FIG. 4.

Figure 4:
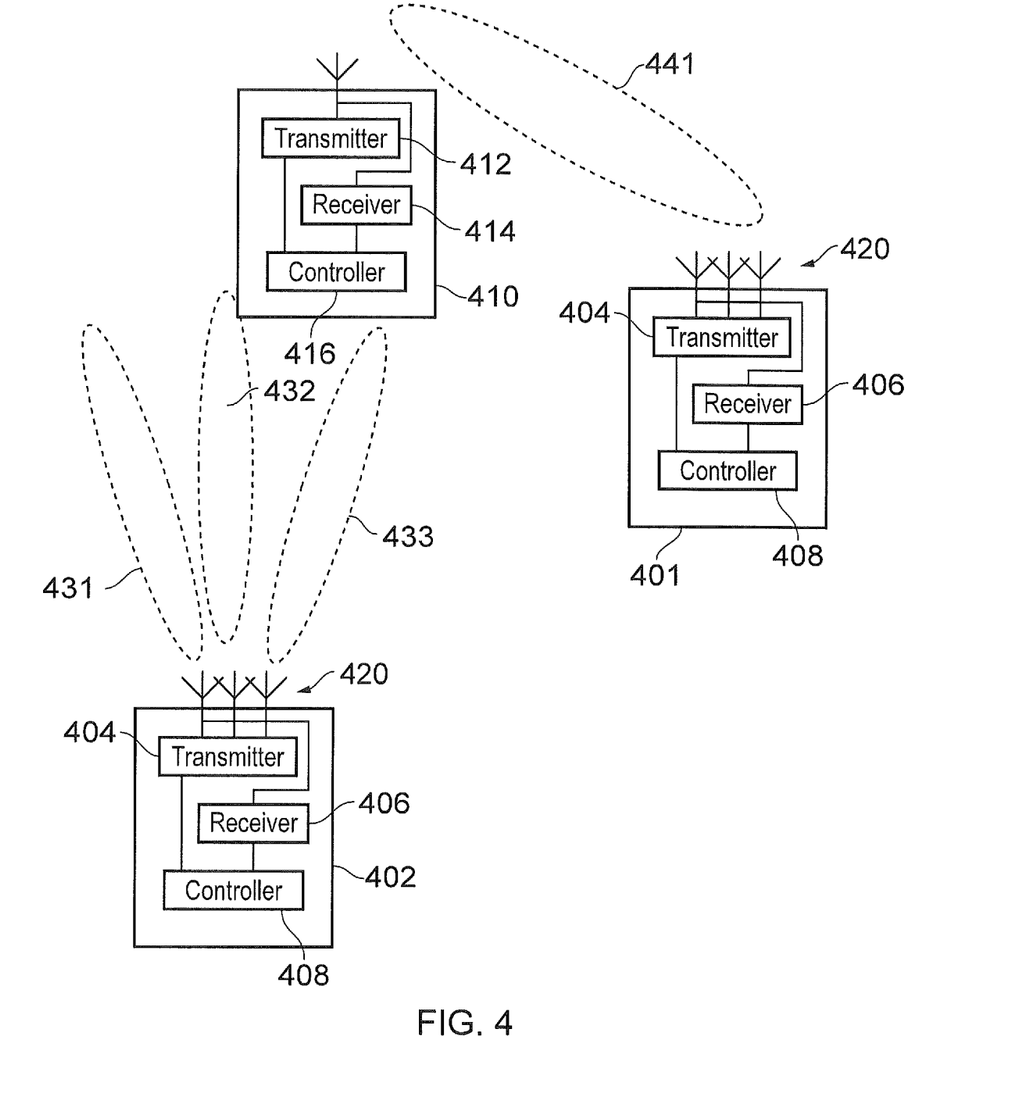
FIG. 4 is a simplified schematic block diagram of radio infrastructure equipment of a wireless communications network shown in FIG. 2A and a communications device illustrating a process of transmitting data as beams of signals.

FIG. 4 provides a representation of a simplified implementation of two of the radio infrastructure equipment or TRP 401, 402 and a communications device or UE 410. As shown in FIG. 4 the communications device 410 includes a transmitter 412, a receiver 414 and a controller 416 which controls the transmitter and the receiver to transmit and receive signals representing data via the wireless access interface to the TRP 401, 402 and from the TRP 401, 402. The TRPs 401, 402 correspondingly include a transmitter 404, a receiver 406 and a controller 408. The transmitter 404 may include analogue and digital circuitry such as radio frequency circuits, analogue amplifiers as well as digital signalling processing software implemented as application specific semiconductor circuits, dedicated signalling processing logic and other processors. Similarly the receiver 406 includes radio frequency circuitry signal processing software in the form of digital signal processors and other devices for detecting signals. The controller 408 is formed from control circuitry including processors executing software, application specific semiconductor circuits or hardware circuits executing digital logic. In some examples the controller can include a so-called "scheduler" which schedules the transmission of signals and the reception of signals via the wireless access interface. Similarly the transmitter 412 and the receiver 414 of the communications device 410 may include analogue as well as digital components, radio frequency filters and transmitters as well as digital signal processing and software controlled processors. The control circuitry 416 controls the transmitter 412 and receiver 414 using software control processors, application specific semiconductor devices or other digital hardware.

As shown in FIG. 4 each of the TRP 401, 402 includes a plurality of antennas 420. In accordance with the present technique the signals transmitted by each of the antennas 420 may be adapted in phase so that the signals add coherently in a particular direction with the effect that a signal strength of the radio signals transmitted in this direction is significantly higher than other directions. Accordingly the antennas in combination with a transmitter 404 can form the radio signals into a plurality of "beams" 431, 432, 433, 441.

Furthermore because of the nature of the transmission of radio signals within a millimetre waveband, the beams 431, 432, 433, 441 may be transmitted to particular communications devices 410 and each of the beams 431, 432, 433, 441 may be identified using some appropriate identifier. In some examples the identifier can be made using reference signals transmitted with the radio signals forming the beam. The identifier can additionally be associated with a timing of the transmission of the beams. The radio signals themselves may also include a cell identifier, which identifies the infrastructure equipment or TRP or group of TRPs supporting a cell which transmitted the signals. For this reason the term cell can be used interchangeably with TRP or infrastructure equipment which is operating to provide the cell. As shown in FIG. 4, one of the TRP 401, 402 can transmit a plurality of the beams 431, 432, 433 to the same communications device 410, which can therefore be individually identified. The beams 431, 432, 433 can also be transmitted in a broadcast manner, transmitting information such as synchronisation information, system information etc.

Correspondingly, the UE 410 can also be provided with an antenna array which can be used to transmit signals as a beam formed using that antenna array with a directional bias based on a phase shift from each antenna which results in the signals from each antenna combining coherently in one direction.

Embodiments of the present technique relate to application of a plurality of beams transmitted by infrastructure equipment such as a TRP 401, 402 to a communications device 410 and a management of mobility and selection of the most appropriate TRP 401, 402 or cell formed by the TRP 401, 402 in dependence upon a number of beams transmitted by the TRP 401, 402.

In conventional networks, beamforming is typically used for UE specific data where the UE feeds back beamforming weights, i.e. pre-coding vectors, to the eNB and the eNB selects a suitable set of precoding weights to form a beam directed towards the UE. This method would only increase the coverage of UE specific data but cannot be used for common channels for common messages such as MIB or SIB. Beam sweeping is proposed in [3] to extend the coverage for common channels, where a beam providing common channels is directed in different angles at different times. An example is shown FIG. 5, where the eNB or TRP 210 directs the beam in the south east direction 502 at time $\tau_0$ and moves the beam in a counter clock wise manner by X° in time until $\tau_1$ and proceeds in this manner for different beam directions 504, 506, 508, 510, 512 until the beam points to the north east direction 514 at time $\tau_6$, after which, the beam sweeping starts again from direction 502. This enables the eNB or TRP 210 to transmit a common channel over a larger area, over a time period, compared to the non-beamformed coverage area 301 as shown in FIG. 3. It will be appreciated that beam sweeping can also be used for UE specific data where the UE 410 is served by one or more sweeping beams.

Figure 5:
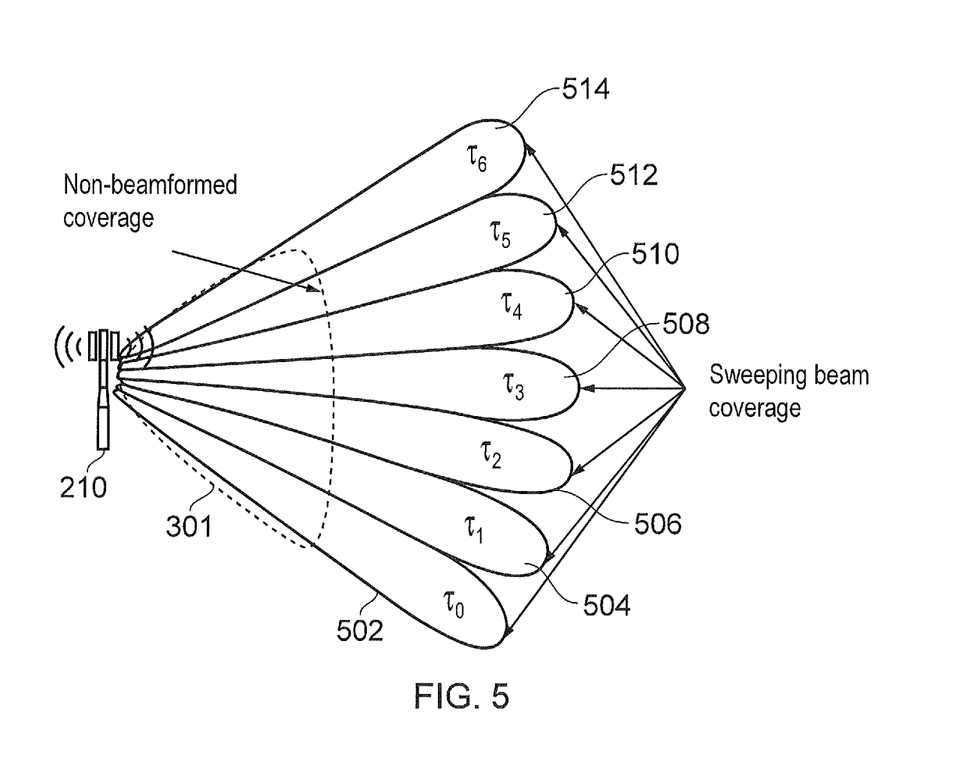
FIG. 5 is a schematic representation illustrating how a beam of signals can be used to transmit data by sweeping the beam through a plurality of different directions.

Due to mobility and changes to radio conditions, a beam serving a UE will change. The change in beam can come from the same eNB or TRP 210, 401, 402 or a different (neighbouring) TRP 210, 401, 402 and hence there is a need to perform beam management in such deployment. If a beam assigned to a UE deteriorates too quickly due to beam switching or sudden changes in radio condition, the UE may face radio link failure leading to interruptions in data transmission/reception. In [4], it is proposed that an alternative beam, which is referred to as a fall back beam is provided to the UE by a TRP for such cases so that the UE can fall back to this alternative beam if the main beam or serving beam fails.

5G Front End Architecture

Within RAN4 of 3GPP, active discussions on suitable 5G front-end architectures are taking place. Candidate frequencies for >6 GHz 5G are likely to be in the 28 GHz range [5], [6]. Beamforming architectures are likely to be adopted at both the eNodeB (BS) and UE (MS) sides in order to achieve line of sight (LOS) and non-line of sight (NLOS) connectivity with realistic inter-cell BS distances.

For the UE, beamforming will typically require 4 to 16 elements within an antenna sub-array. In order to achieve close to omnidirectional coverage, several antenna sub-arrays may be required at different locations within the UE.

Possible front-end UE beam forming architectures are shown in FIGS. 6A to 6D, which are recreated from [7]. The architecture of each of FIGS. 6A to 6C has, in order and each providing their output as an input to the next stage, a digital signal processor (DSP) 601, a digital-to-analogue converter (DAC) 602, a low pass filter 604 and a variable gain amplifier 606.

Figure 6A:
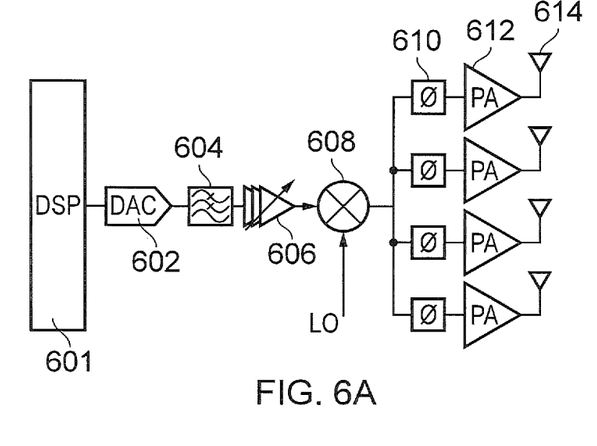
FIGS. 6A to 6D show examples of front end architectures for 5G NR systems.
Figure 6B:
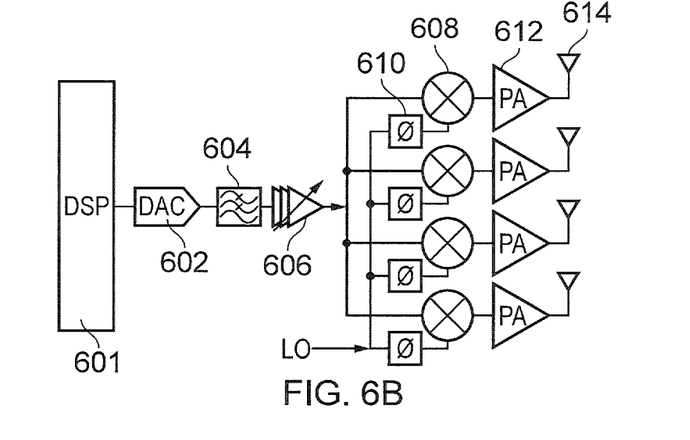
Figure 6C:
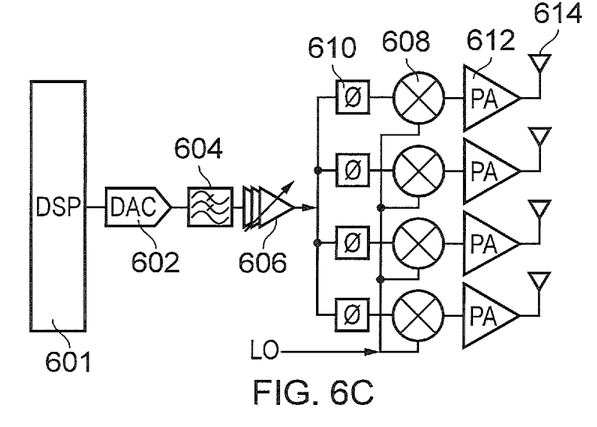

FIG. 6A has a single multiplier 608 taking a second input from a local oscillator, which feeds into a plurality of stages each comprising a phase shifting element 610, a power amplifier 612 and an antenna 614. FIG. 6B has a plurality of stages comprising a multiplier 608 (which takes a second input from a local oscillator whose output is shifted in phase by a phase shifting element 610), a power amplifier 612 and an antenna 614. FIG. 6C has a plurality of stages each comprising a phase shifting element 610, a multiplier 608 taking a second input from a local oscillator, a power amplifier 612 and an antenna 614.

Figure 6D:
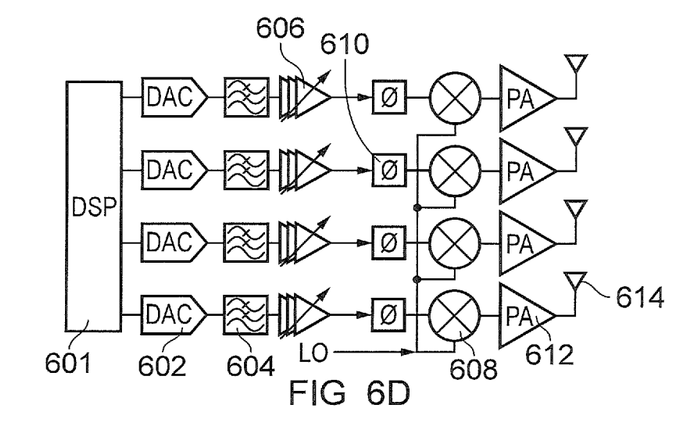

FIG. 6D has a DSP 601, but then is divided into a plurality of stages. Each of these stages has a DAC 602, a low pass filter 604, a variable gain amplifier 606, a phase shifting element 610, a multiplier 608 taking a second input from a local oscillator, a power amplifier 612 and an antenna 614.

For 5G UE application, it is sufficient for just phase control on each antenna element. In case of BS, it is likely that both phase and amplitude control is required in order to handle multiple data streams and more tightly control the antenna beam which is formed from a much greater number of antenna elements (typically ≥64) compared to UE (typically ≤16).

The phase shifting function required for phased array architectures may be implemented in several ways as shown in FIGS. 6A to 6D. The required phase shifting function would normally be placed prior to the power amplifier (PA) due to the high loss of the phase shifter and its impact on transmit and receive performance. As shown in FIGS. 6A to 6D, the phase shifters 610 are before the power amplifiers 612 in the transmitter chain.

However, technologies are now maturing which permit acceptable losses to be achieved in the phase shifter. This permits the following reduced complexity architecture shown in FIG. 7, which has also been recreated from [7].

Figure 7:
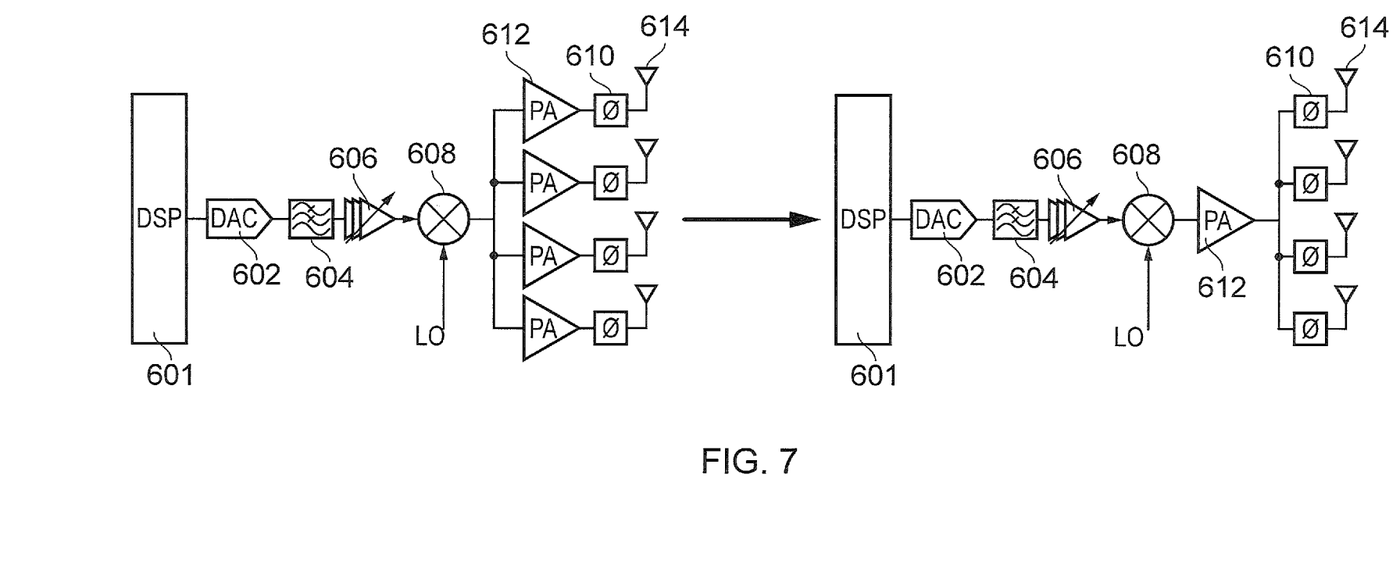
FIG. 7 shows an example of a reduced complexity front end architecture for 5G NR systems.

The architecture on the left hand side of FIG. 7 is similar to that of FIG. 6A, with the only difference being that the power amplifiers 612 are before the phase shifting elements 610. The reduced complexity architecture on the right hand side of FIG. 7 again shows a similar arrangement to that of FIG. 6A, with the power amplifier 612 again being before the phase shifting elements 610. However, only one power amplifier 612 is now required for the entire architecture.

Figure 8:
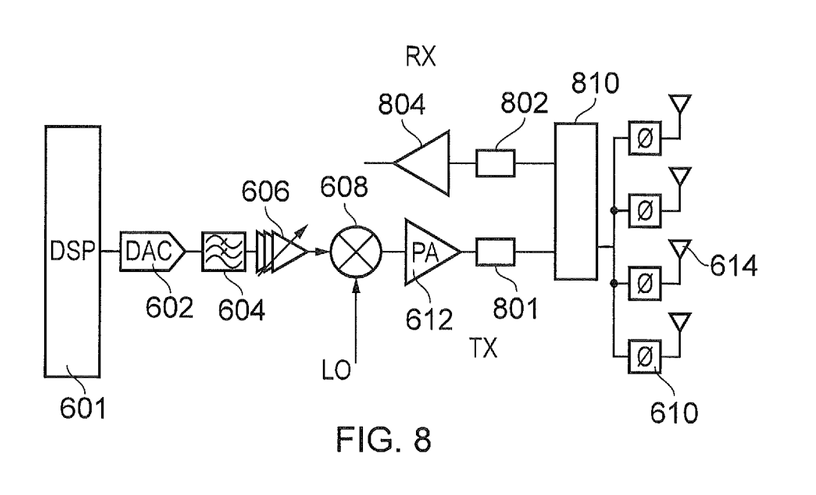
FIG. 8 shows another arrangement of the reduced complexity front end architecture for 5G NR systems shown by FIG. 7.

FIG. 8 shows the reduced complexity architecture of the right hand side of FIG. 7, but taking into account both transmit (TX) and receive (RX) time division duplexing (TDD) architecture of 5G, and adding the TX 801 and RX 802 filters and possible RX Low Noise Amplifier (LNA) 804 and single pole double throw (SPDT) switch 810 which would be required for each TX/RX chain. Again there are four antenna elements shown; there would typically be between 4 and 16.

The major advantage of the architecture of FIG. 8 compared to those in FIGS. 6A to 6D is that only one power amplifier, SPDT TDD switch and other associated functions such as TX and RX filters and LNAs are required, whereas in the cases of FIGS. 6A to 6D, such functions are required for every antenna element (since there is one TX & RX chain for each element for the architecture in FIGS. 6A to 6D). Moreover, the use of one high power PA for this architecture permits the efficiency to be optimised to a much higher level than for smaller single power amplifiers since more optimum device technologies may be used (e.g. Gallium Arsenide or Gallium Nitride instead of complementary metal-oxide-semiconductor (CMOS)) together with efficiency enhancement techniques such as digital pre-distortion (DPD) or analogue pre-distortion (APD) or Doherty or other architectures. Further to this, the use of one high power PA avoids potential variation among outputs of the plurality of PAs as shown in the cases of FIGS. 6A to 6D. Variation of single amplitudes among antennas due to, for example, a variation in temperatures of the PAs, may have an impact on beamforming. Such techniques often have overheads in terms of additional power consumption, size and complexity. However, if applied to only one high power PA rather than to many low power PAs, they become much more feasible and the overall size and complexity (due to reduced number of front-end components) is still likely to be less than for the more traditional distributed architectures in FIGS. 6A to 6D.

Use of a single high power PA will also overcome inter-element interactions associated with the architectures in FIGS. 6A to 6D. Many power amplifiers in close proximity (inter-element distances only a few mm, half wavelength for beamforming) are likely to create load-line distortions which will result in impairments to system efficiency and possible distortion or instabilities.

5G Front End Architecture Addressing 3GPP Requirement of Initial Access

In embodiments of the present technique, there is provided a communications apparatus comprising a power amplifier configured to amplify a signal for transmission, a controllable switch coupled to an output of the power amplifier, an omnidirectional antenna coupled to a first output of the controllable switch, an antenna array coupled to a second output of the controllable switch, the antenna array comprising a plurality of antennas configured to form the signal into a beam of transmitted signals, the beam having a directional bias with respect to a location of the communications apparatus, and a controller configured to control the controllable switch to switch a between a first mode of operation of the communications apparatus in which the signal for transmission from the output of the power amplifier is fed to the omnidirectional antenna, and a second mode of operation of the communications apparatus in which the signal from the output of the power amplifier is fed to the antenna array. In embodiments of the present technique, each of the plurality of antennas of the antenna array is connected to the controllable switch via one of a plurality of phase shifting elements, the phase shifting elements configured to control the phase of signals received by the antennas of the antenna array. In some embodiments of the present technique, the plurality of phase shifting elements are further configured to control the amplitude of signals received by the antennas of the antenna array.

An important aspect of cellular communication systems is that, prior to actual data communication, the UE must identify the most suitable eNodeB/BS (base station) in the vicinity (there are other system architectures where the UE needs to be identified by the most suitable eNodeB/basestation). One method of doing this quickly and effectively is to use a high power near omnidirectional signal that nearby base stations can identify and respond to. Through this process, the UE will identify the most suitable local BS for data communication (or be identified by the most suitable local BS for data communication) and data transfer will then commence using beamforming at both UE and BS side.

In one example of this process, the near omnidirectional signal contains a physical random access channel (PRACH) preamble. Local base stations detect this PRACH preamble. The base stations may then communicate over a backhaul interface with other base stations in order to determine which basestation is the most suitable basestation to communicate with the UE (this decision could be made by e.g. comparing the received signal strengths of the PRACH preamble at the base stations). The base stations can determine the direction of the received near omnidirectional signal, using techniques known in the art. The determined basestation can then beam-form a downlink response signal to the UE. This initial process of identification of the most suitable BS in the local vicinity is called initial access. In other words, in the first mode of operation, the communications apparatus is configured to transmit, using the omnidirectional antenna, an initial access signal, to transition, using the switch, into the second mode of operation, and to receive, using the antenna array, a response signal from a base station in response to the initial access signal, the response signal instructing the communications apparatus that it should transmit signals representing data to and receive signals representing data from the base station.

It is noted that there are methods of UL beamforming the initial access signal from the UE. In one example method, the UE beam sweeps its UL signal (or DL receiver: receive beamforming). Assuming a pattern of beamforming at the basestation and the UE, the UE can eventually determine a preferred transmit and receive beam for communication with the basestation. The determination of the preferred UE transmit and receive beams at the UE can take a significant amount of time, hence there is still a motivation for transmitting a near omnidirectional signal from the UE for low latency initial access (ultra reliable low latency communications, URLLC, are an important 5G use case and these communications are sensitive to latency).

The UE can also be required to transmit UL near omnidirectional signals for purposes of mobility. In such cases, the UE periodically transmits an UL signal that identifies the UE (the UL signal could be a set of reference signals identifying the UE, or could be a random-access type signal). The base stations detect this UL mobility signal and then determine which base station is the most suitable for serving the UE. In other words, in the first mode of operation, the communications apparatus is configured to periodically transmit, using the omnidirectional antenna, a mobility signal comprising a unique identifier, the unique identifier being associated with the communications apparatus, to transition, using the switch, into the second mode of operation, and to receive, using the antenna array, a response signal from a base station in response to the mobility signal, the response signal instructing the communications apparatus that it should transmit signals representing data to and receive signals representing data from the base station.

One problem for the more conventional beamforming architectures in FIGS. 6A to 6D is that each PA is relatively low power since it is only feeding a single antenna element. In order to provide the initial access function, an additional high power PA will be required in addition to an omnidirectional radiating antenna element to provide this initial access functionality. However, in the case of the architecture in FIG. 8 this initial access functionality can be provided with low or at least reduced complexity, as is shown in FIG. 9.

Figure 9:
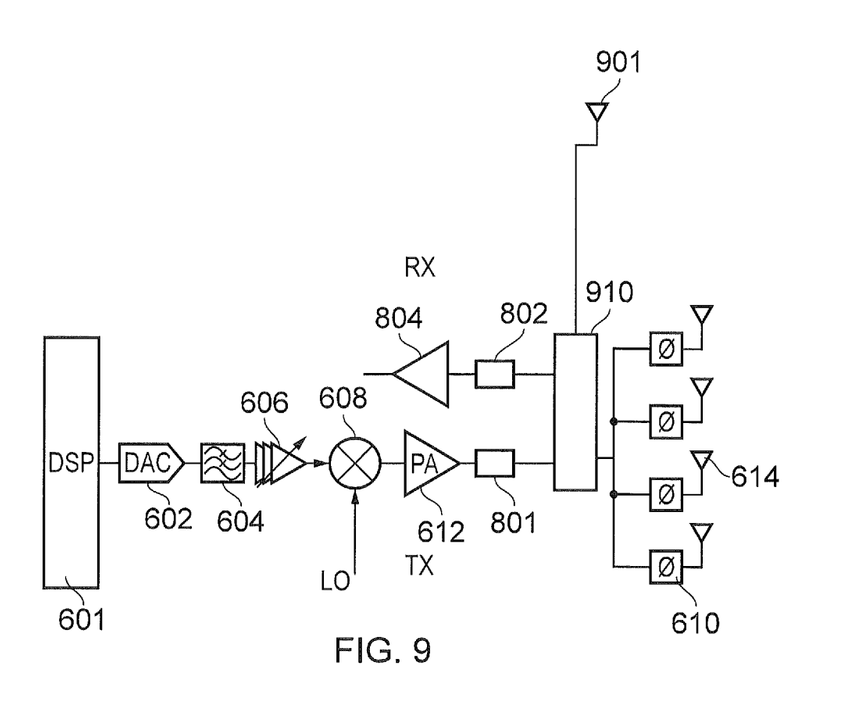
FIG. 9 shows a front end architecture for 5G NR systems in accordance with embodiments of the present technique.

FIG. 9 shows a front end architecture for 5G NR systems in accordance with embodiments of the present technique. The architecture of FIG. 9 is similar to the architecture of FIG. 8, but with an omnidirectional antenna 901 and a double pole double throw (DPDT) switch 910 instead of the SPDT switch 810 of FIG. 8. The existing single high power PA already has sufficient output power capability to provide the initial access functionality.

Apart from the additional antenna element shown in FIG. 9, the only major architectural change would be the use of a more complex switch: the TX/RX TDD SPDT switch would be replaced by a more complex switch such as a DPDT device. A small amount of additional insertion loss would be incurred but the increased complexity would be minimal.

In general, this architectural approach may also permit other functions, in addition to initial access, including uplink-based mobility functionality.

In this main embodiment, the DPDT switch is controlled by a controller to:

use the omnidirectional antenna for initial access and/or mobility functionality use the antenna array in other cases In another embodiment of the invention, the DPDT switch is controlled by the controller to switch based on the particular PRACH preamble that is to be transmitted. For example, the network can indicate to the UE that certain PRACH preambles are to be transmitted using an omnidirectional antenna and other PRACH preambles are to be beamformed (e.g. PRACH preambles associated with low latency communications are transmitted using the omnidirectional antenna). In this case, the DPDT switch position is controlled on the basis of the PRACH preamble that is transmitted. In other words, the initial access signal or the random access signal comprises a physical random access channel, PRACH, preamble. In this embodiment of the invention, the controlling of the switch by the controller is performed on the basis of a physical random access channel, PRACH, preamble forming a part of the signal received from the output of the power amplifier In general, other more complex switching arrangements might be deployed where more than one additional antenna is utilised. This would require switches of the form nPDT where n−1 is the additional number of antennae used for additional functions. In other words, in some embodiments of the present technique, the communications apparatus comprises one or more further omnidirectional antennas, wherein the controllable switch is an n-pole double throw, nPDT, switch, where n is equal to one greater than the number of omnidirectional antennas of the communications apparatus.

In some embodiments of the present technique, the communications apparatus comprises one or more further antenna arrays, wherein each of the one or more further antenna arrays comprising one or more antennas.

The omnidirectional antenna may be implemented as a patch antenna or a dipole or the like. The Power Amplifier may be a CMOS implementation and the controllable switch may be implemented as interconnected FETs. Other technology choices for the PA could include Gallium Arsenide or Gallium Nitride, SiGe or SOI (Silicon on Insulator). The switch could also be implemented on these technologies, or using MEMS technology.

Furthermore the omnidirectional antenna equipped by the UE may be formed by the combination of one or more patch antennas, a printed antenna on a PCB (Printed Circuit Board), chassis or the like, an on-chip antenna on a semiconductor process such as CMOS or the like including module technology such as glass or low temperature co-fired ceramic (LTCC). It is well known that the path antenna such as a microstrip antenna generally has a directivity gain of approximately 6 to 9 dBi (decibels relative to isotropic) by a single element. In the case that the patch antenna is implemented into a handset, the directivity of the antenna should have some impact from a finite ground plane or shield of the handset. In short, the antenna portion and ground plane of the handset may be one set of antenna and equivalently regarded as similar structure to dipole antenna, and a directivity close to omnidirectional one can be obtained at an azimuth cut of the handset. Here, directivity of the omnidirectional antenna may include widely not only that from antenna part, but also any effect from a finite ground plane or shield of the handset.

The definition of an omnidirectional antenna would be clear to those skilled in the art. However, in some embodiments of the present technique, since beamforming antenna arrays will generally be designed to operate at +/−90° (depending on phase shifter settings), an omnidirectional antenna may have an instantaneous coverage of >+/−90° by use of one or more antenna or may generally transmit in several directions.

In some embodiments of the present technique, an omnidirectional antenna is an additional radiating element which provides a radiating beam which is not subject to phase (and possibly amplitude) control that an element which forms part of a beamforming array would be subjected to. The radiated power of such a radiating element would also typically be at least several times higher (>2×) that an element in a beamforming array. In other words, in some embodiments of the present technique, the omnidirectional antenna of the communications apparatus has a radiated power which is higher than a radiated power of each of the antennas in the antenna array of the communications apparatus.

Advantages of embodiments of the present technique include the simplification and optimisation of front end architectures of communications apparatuses for 5G/NR mobile communications systems, and address how functions such as initial access and mobility may be managed.

The following numbered paragraphs provide further example aspects and features of the present technique:

Paragraph 1. A communications apparatus comprising
- a power amplifier configured to amplify a signal for transmission,
- a controllable switch coupled to an output of the power amplifier,
- an omnidirectional antenna coupled to a first output of the controllable switch,
- an antenna array coupled to a second output of the controllable switch, the antenna array comprising a plurality of antennas configured to form the signal into a beam of transmitted signals, the beam having a directional bias with respect to a location of the communications apparatus, and
- a controller configured to control the controllable switch to switch a between a first mode of operation of the communications apparatus in which the signal for transmission from the output of the power amplifier is fed to the omnidirectional antenna, and a second mode of operation of the communications apparatus in which the signal from the output of the power amplifier is fed to the antenna array.

Paragraph 2. A communications apparatus according to Paragraph 1, wherein when in the first mode of operation, the communications apparatus is configured
- to transmit, using the omnidirectional antenna, an initial access signal,
- to transition, using the switch, into the second mode of operation, and
- to receive, using the antenna array, a response signal from a base station in response to the initial access signal, the response signal instructing the communications apparatus that it should transmit signals representing data to and receive signals representing data from the base station.

Paragraph 3. A communications apparatus according to Paragraph 1, wherein when in the first mode of operation, the communications apparatus is configured
- to periodically transmit, using the omnidirectional antenna, a mobility signal comprising a unique identifier, the unique identifier being associated with the communications apparatus,
- to transition, using the switch, into the second mode of operation, and
- to receive, using the antenna array, a response signal from a base station in response to the mobility signal, the response signal instructing the communications apparatus that it should transmit signals representing data to and receive signals representing data from the base station.

Paragraph 4. A communications apparatus according to Paragraph 2 or Paragraph 3, wherein the initial access signal or the random access signal comprises a physical random access channel, PRACH, preamble.

Paragraph 5. A communications apparatus according to any of Paragraphs 1 to 4, wherein the controllable switch is a double pole double throw, DPDT, switch.

Paragraph 6. A communications apparatus according to any of Paragraphs 1 to 5, wherein each of the plurality of antennas of the antenna array is connected to the controllable switch via one of a plurality of phase shifting elements, the phase shifting elements configured to control the phase of signals received by the antennas of the antenna array.

Paragraph 7. A communications apparatus according to Paragraph 6, wherein the plurality of phase shifting elements are further configured to control the amplitude of signals received by the antennas of the antenna array.

Paragraph 8. A communications apparatus according to any of Paragraphs 1 to 7, wherein the controlling of the switch by the controller is performed on the basis of a physical random access channel, PRACH, preamble forming a part of the signal received from the output of the power amplifier.

Paragraph 9. A communications apparatus according to any of Paragraphs 1 to 8, comprising one or more further omnidirectional antennas, wherein the controllable switch is an n-pole double throw, nPDT, switch, where n is equal to one greater than the number of omnidirectional antennas of the communications apparatus.

Paragraph 10. A communications apparatus according to any of Paragraphs 1 to 9, comprising one or more further antenna arrays, wherein each of the one or more further antenna arrays comprising one or more antennas.

Paragraph 11. A communications apparatus according to any of Paragraphs 1 to 10, wherein the omnidirectional antenna has a radiated power which is higher than a radiated power of each of the antennas in the antenna array.

Paragraph 12. A method of controlling a communications apparatus comprising a power amplifier configured to amplify a signal for transmission, a controllable switch coupled to an output of the power amplifier, an omnidirectional antenna coupled to a first output of the controllable switch, an antenna array coupled to a second output of the controllable switch, the antenna array comprising a plurality of antennas configured to form the signal into a beam of transmitted signals, the beam having a directional bias with respect to a location of the communications apparatus, and a controller configured to control the switch, wherein the method comprises
- switching between a first mode of operation of the communications apparatus in which the signal for transmission from the output of the power amplifier is fed to the omnidirectional antenna, and a second mode of operation of the communications apparatus in which the signal from the output of the power amplifier is fed to the antenna array Paragraph 13. A method according to Paragraph 12, wherein when in the first mode of operation, the method comprises
- transmitting, using the omnidirectional antenna, an initial access signal,
- transitioning, using the switch, into the second mode of operation, and
- receiving, using the antenna array, a response signal from a base station in response to the initial access signal, the response signal instructing the communications apparatus that it should transmit signals representing data to and receive signals representing data from the base station.

Paragraph 14. A method according to Paragraph 12, wherein when in the first mode of operation, the communications apparatus is configured
- transmitting periodically, using the omnidirectional antenna, a mobility signal comprising a unique identifier, the unique identifier being associated with the communications apparatus,
- transitioning, using the switch, into the second mode of operation, and
- receiving, using the antenna array, a response signal from a base station in response to the mobility signal, the response signal instructing the communications apparatus that it should transmit signals representing data to and receive signals representing data from the base station.

Paragraph 15. A mobile telecommunications system comprising a communications apparatus comprising
- a power amplifier configured to amplify a signal for transmission,
- a controllable switch coupled to an output of the power amplifier,
- an omnidirectional antenna coupled to a first output of the controllable switch,
- an antenna array coupled to a second output of the controllable switch, the antenna array comprising a plurality of antennas configured to form the signal into a beam of transmitted signals, the beam having a directional bias with respect to a location of the communications apparatus, and
- a controller configured to control the controllable switch to switch a between a first mode of operation of the communications apparatus in which the signal for transmission from the output of the power amplifier is fed to the omnidirectional antenna, and a second mode of operation of the communications apparatus in which the signal from the output of the power amplifier is fed to the antenna array.

Paragraph 16. Circuitry for a communications apparatus comprising
- a power amplifier configured to amplify a signal for transmission,
- a controllable switch coupled to an output of the power amplifier,
- an omnidirectional antenna coupled to a first output of the controllable switch,
- an antenna array coupled to a second output of the controllable switch, the antenna array comprising a plurality of antennas configured to form the signal into a beam of transmitted signals, the beam having a directional bias with respect to a location of the communications apparatus, and
- a controller configured to control the controllable switch to switch a between a first mode of operation of the communications apparatus in which the signal for transmission from the output of the power amplifier is fed to the omnidirectional antenna, and a second mode of operation of the communications apparatus in which the signal from the output of the power amplifier is fed to the antenna array.

Described embodiments may be implemented in any suitable form including hardware, software, firmware or any combination of these. Described embodiments may optionally be implemented at least partly as computer software running on one or more data processors and/or digital signal processors. The elements and components of any embodiment may be physically, functionally and logically implemented in any suitable way. Indeed the functionality may be implemented in a single unit, in a plurality of units or as part of other functional units. As such, the disclosed embodiments may be implemented in a single unit or may be physically and functionally distributed between different units, circuitry and/or processors.

Although the present disclosure has been described in connection with some embodiments, it is not intended to be limited to the specific form set forth herein. Additionally, although a feature may appear to be described in connection with particular embodiments, one skilled in the art would recognize that various features of the described embodiments may be combined in any manner suitable to implement the technique.

REFERENCES

[1] LTE for UMTS: OFDMA and SC-FDMA Based Radio Access, Harris Holma and Antti Toskala, Wiley 2009, ISBN 978-0-470-99401-6.
[2] R2-166398, "Introduction of mobility enhancement UE capabilities." Huawei et al.
[3] RP-160671, "New SID Proposal: Study on New Radio Access Technology," NTT DOCOMO, RAN #71.
[4] R2-166391 "DL Beam Management in the Multi-Beam based NR system," Samsung, RAN2 #95bis.
[5] R4-1609590, "UE reference architecture for NR," Ericsson, Sony.
[6] R4-1609592, "TP for 38.803: UE beamforming and number of UE transmitter antenans," Ericsson, Sony.
[7] "Advance Architectures for Efficient mm-Wave CMOS Wireless Transmitters," JiaShu Chen, May 2014.

What is claimed is:

1. A communications apparatus, comprising:
   a power amplifier configured to amplify a signal for transmission;
   a controllable switch coupled to an output of the power amplifier;
   an omnidirectional antenna coupled to a first output of the controllable switch, wherein the omnidirectional antenna is configured to, in a first mode of operation, periodically transmit a mobility signal comprising a unique identifier, the unique identifier being associated with the communications apparatus;
   an antenna array coupled to a second output of the controllable switch, the antenna array comprising a plurality of antennas configured to form the signal into a beam of transmitted signals, the beam having a directional bias with respect to a location of the communications apparatus; and
   a controller configured to control the controllable switch to switch a between the first mode of operation of the communications apparatus in which the signal for transmission from the output of the power amplifier is fed to the omnidirectional antenna, and a second mode of operation of the communications apparatus in which the signal from the output of the power amplifier is fed to the antenna array.

2. The communications apparatus according to claim 1, wherein when in the first mode of operation, the communications apparatus is configured to
   transmit, using the omnidirectional antenna, an initial access signal,
   transition, using the switch, into the second mode of operation, and
   receive, using the antenna array, a response signal from a base station in response to the initial access signal, the response signal instructing the communications apparatus that it should transmit signals representing data to and receive signals representing data from the base station.

3. The communications apparatus according to claim 2, wherein the initial access signal or the random access signal comprises a physical random access channel (PRACH) preamble.

4. The communications apparatus according to claim 1, wherein when in the first mode of operation, the communications apparatus is configured to transition, using the switch, into the second mode of operation, and receive, using the antenna array, a response signal from a base station in response to the mobility signal, the response signal instructing the communications apparatus that it should transmit signals representing data to and receive signals representing data from the base station.

5. The communications apparatus according to claim 1, wherein the controllable switch is a double pole double throw (DPDT) switch.

6. The communications apparatus according to claim 1, wherein each of the plurality of antennas of the antenna array is connected to the controllable switch via one of a plurality of phase shifting elements, the phase shifting elements configured to control the phase of signals received by the antennas of the antenna array.

7. The communications apparatus according to claim 6, wherein the plurality of phase shifting elements are further configured to control the amplitude of signals received by the antennas of the antenna array.

8. The communications apparatus according to claim 1, wherein the controlling of the switch by the controller is performed on the basis of a physical random access channel, PRACH, preamble forming a part of the signal received from the output of the power amplifier.

9. The communications apparatus according to claim 1, comprising one or more further omnidirectional antennas, wherein
the controllable switch is an n-pole double throw (nPDT) switch, where n is equal to one greater than the number of omnidirectional antennas of the communications apparatus.

10. The communications apparatus according to claim 1, comprising one or more further antenna arrays, wherein each of the one or more further antenna arrays comprising one or more antennas.

11. The communications apparatus according to 1, wherein the signals are transmitted from the omnidirectional antenna with a radiated power which is higher than a radiated power of the signals transmitted from each of the antennas in the antenna array.

12. A method of controlling a communications apparatus including a power amplifier configured to amplify a signal for transmission, a controllable switch coupled to an output of the power amplifier, an omnidirectional antenna coupled to a first output of the controllable switch, wherein the omnidirectional antenna is configured to, in a first mode of operation, periodically transmit a mobility signal comprising a unique identifier, the unique identifier being associated with the communications apparatus, an antenna array coupled to a second output of the controllable switch, the antenna array comprising a plurality of antennas configured to form the signal into a beam of transmitted signals, the beam having a directional bias with respect to a location of the communications apparatus, and a controller configured to control the switch, wherein the method comprises:

switching between the first mode of operation of the communications apparatus in which the signal for transmission from the output of the power amplifier is fed to the omnidirectional antenna, and a second mode of operation of the communications apparatus in which the signal from the output of the power amplifier is fed to the antenna array.

13. The method according to claim 12, wherein when in the first mode of operation, the method comprises:
transmitting, using the omnidirectional antenna, an initial access signal;
transitioning, using the switch, into the second mode of operation; and
receiving, using the antenna array, a response signal from a base station in response to the initial access signal, the response signal instructing the communications apparatus that it should transmit signals representing data to and receive signals representing data from the base station.

14. The method according to claim 12, wherein when in the first mode of operation, further comprising:
transitioning, using the switch, into the second mode of operation; and
receiving, using the antenna array, a response signal from a base station in response to the mobility signal, the response signal instructing the communications apparatus that it should transmit signals representing data to and receive signals representing data from the base station.

15. A mobile telecommunications system, comprising:
a communications apparatus including
a power amplifier configured to amplify a signal for transmission,
a controllable switch coupled to an output of the power amplifier,
an omnidirectional antenna coupled to a first output of the controllable switch, wherein the omnidirectional antenna is configured to, in a first mode of operation, periodically transmit a mobility signal comprising a unique identifier, the unique identifier being associated with the communications apparatus,
an antenna array coupled to a second output of the controllable switch, the antenna array comprising a plurality of antennas configured to form the signal into a beam of transmitted signals, the beam having a directional bias with respect to a location of the communications apparatus, and
a controller configured to control the controllable switch to switch a between the first mode of operation of the communications apparatus in which the signal for transmission from the output of the power amplifier is fed to the omnidirectional antenna, and a second mode of operation of the communications apparatus in which the signal from the output of the power amplifier is fed to the antenna array.

* * * * *